(No Model.)
E. BAUER.
CLOTHES LINE FASTENER.
No. 282,601. Patented Aug. 7, 1883.
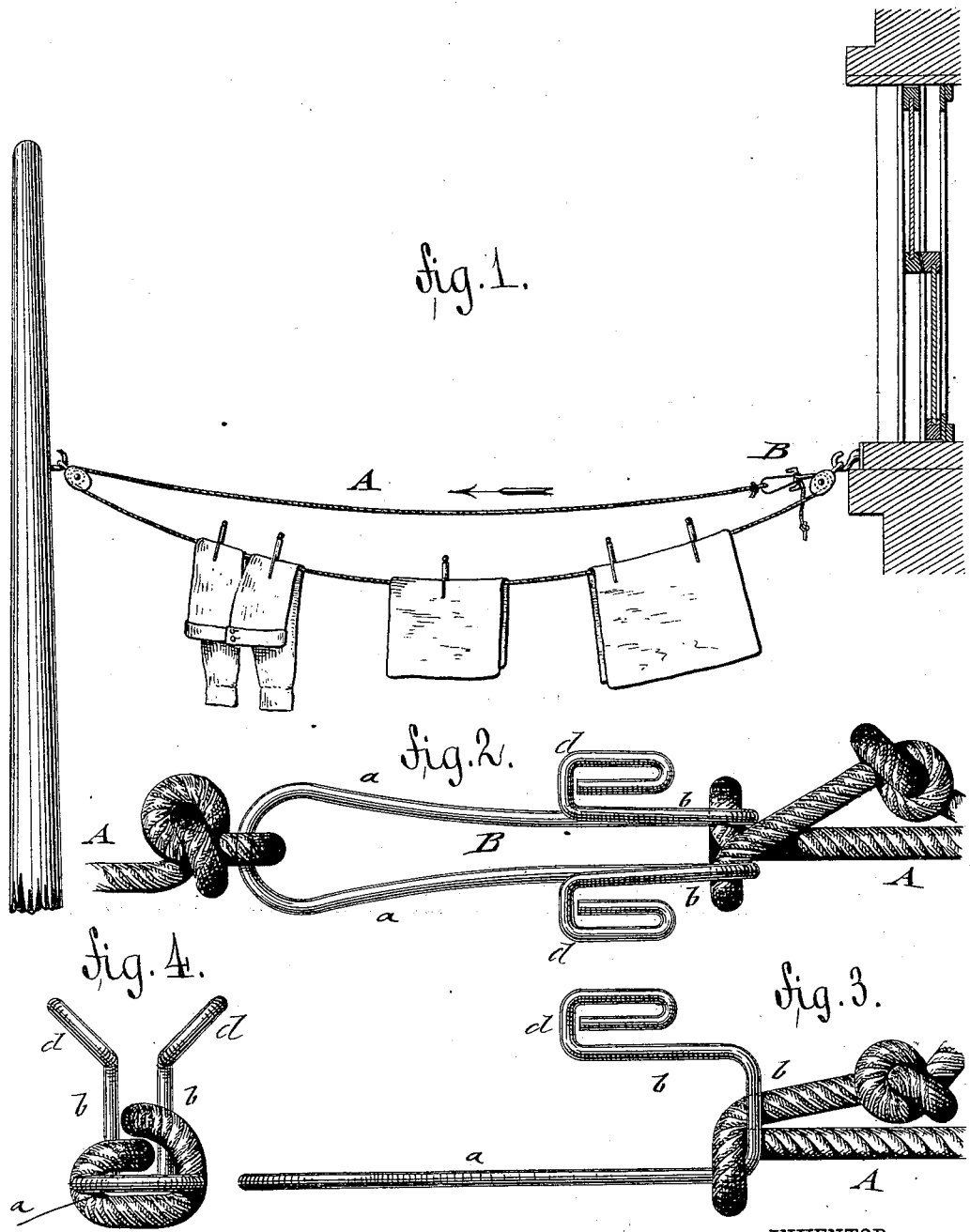

UNITED STATES PATENT OFFICE.

ERNST BAUER, OF BROOKLYN, NEW YORK, ASSIGNOR, BY MESNE ASSIGNMENTS, TO FRIEDRICH CAPPEL, OF SAME PLACE.

CLOTHES-LINE FASTENER.

SPECIFICATION forming part of Letters Patent No. 282,601, dated August 7, 1883.

Application filed May 14, 1883. (No model.)

*To all whom it may concern:*

Be it known that I, ERNST BAUER, of Brooklyn, in the county of Kings and State of New York, have invented certain new and useful Improvements in Clothes-Line Fasteners, of which the following is a specification.

This invention relates to an improved device for fastening clothes-lines; and it consists of a U-shaped wire clamp, the ends of which are first bent at right angles to the body of the clamp, then backward, and then sidewise, so as to facilitate the entrance and fastening of the clothes-line, as will more fully appear hereinafter.

In the accompanying drawings, Figure 1 represents a side view of a clothes-line with my improved fastener shown as applied thereto; and Figs. 2, 3, and 4 are respectively a plan, a side view, and an end view, of the fastener, drawn on a larger scale.

Similar letters of reference indicate corresponding parts.

A in the drawings represents a clothes-line, and B my improved clothes-line fastener or clamp, which is made of a continuous piece of galvanized wire of suitable thickness and strength. The main part $a$ of the fastener B is made of U shape, the ends being first bent up at right angles to the main part $a$, and then backward, so as to form U-shaped portions $b$ at right angles to the body. The ends of the wire clamp are finally sidewise bent into the shape of eyes $d\ d$, that are inclined, so as to facilitate the insertion of the clothes-line between the eyes $d\ d$. The end of the clothes-line is permanently tied to the bent end of the U-shaped main part $a$, while the opposite knotted end of the line is first passed through between the U-shaped ends $b\ b$ of the main part $a$, next below the main part, across the same, and then upward and forward between the ends $b\ b$, as shown in Fig. 2. The wire fastener clamps thereby the end of the clothes-line rigidly between the ends of the fastener in connection with the tension of the line. It also allows the quick detaching of the line therefrom when it is desired to slacken the same.

The fastener can be made cheap, and forms a very reliable and convenient attachment for clothes-lines.

Having thus described my invention, I claim as new and desire to secure by Letters Patent—

A clothes-line fastener or clamp consisting of a U-shaped main part, U-shaped portions $b\ b$, bent at right angles with the main part, and provided with flaring or sidewise inclined eyes $d\ d$, substantially as and for the purpose set forth.

In testimony that I claim the foregoing as my invention I have signed my name in presence of two subscribing witnesses.

ERNST BAUER.

Witnesses:
PAUL GOEPEL,
SIDNEY MANN.